Aug. 29, 1967  M. L. MOBERG ET AL  3,338,087
BREATH ANALYZING APPARATUS
Filed March 4, 1964  4 Sheets-Sheet 1

*INVENTOR.*
E. MILTON WILSON
MILTON L. MOBERG
PHILIP J. MEREDITH

ATTORNEYS

Aug. 29, 1967         M. L. MOBERG ETAL         3,338,087
                    BREATH ANALYZING APPARATUS
Filed March 4, 1964
                                              4 Sheets-Sheet 2

INVENTOR.
E. MILTON WILSON
MILTON L. MOBERG
PHILIP J. MEREDITH
ATTORNEYS

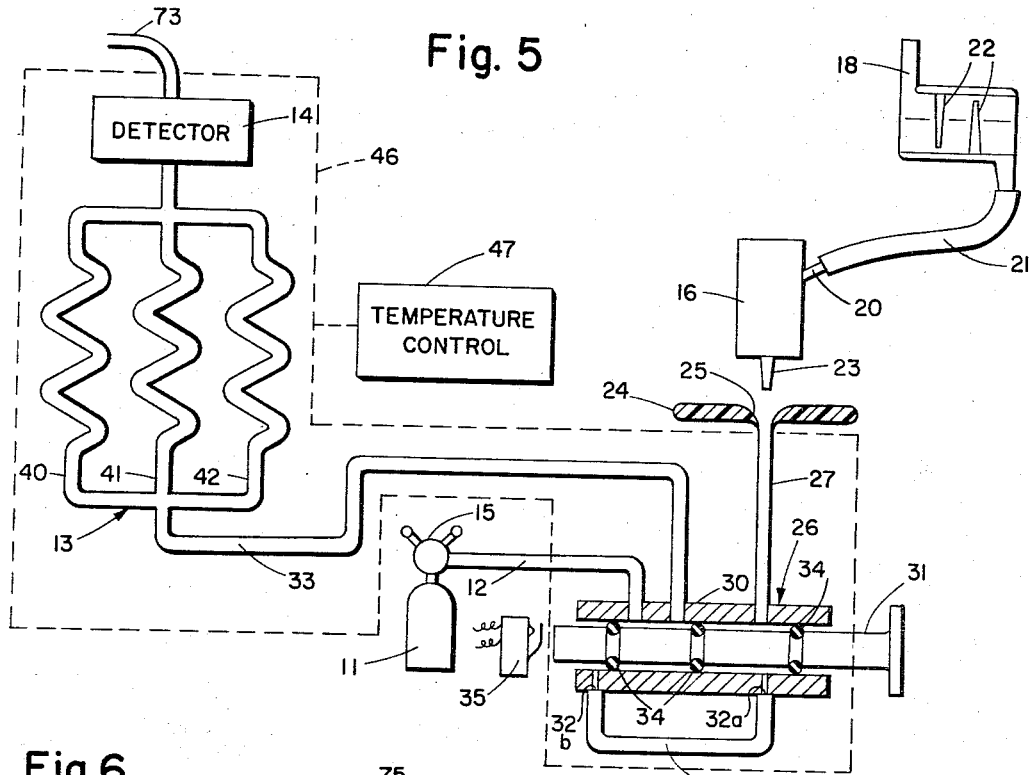
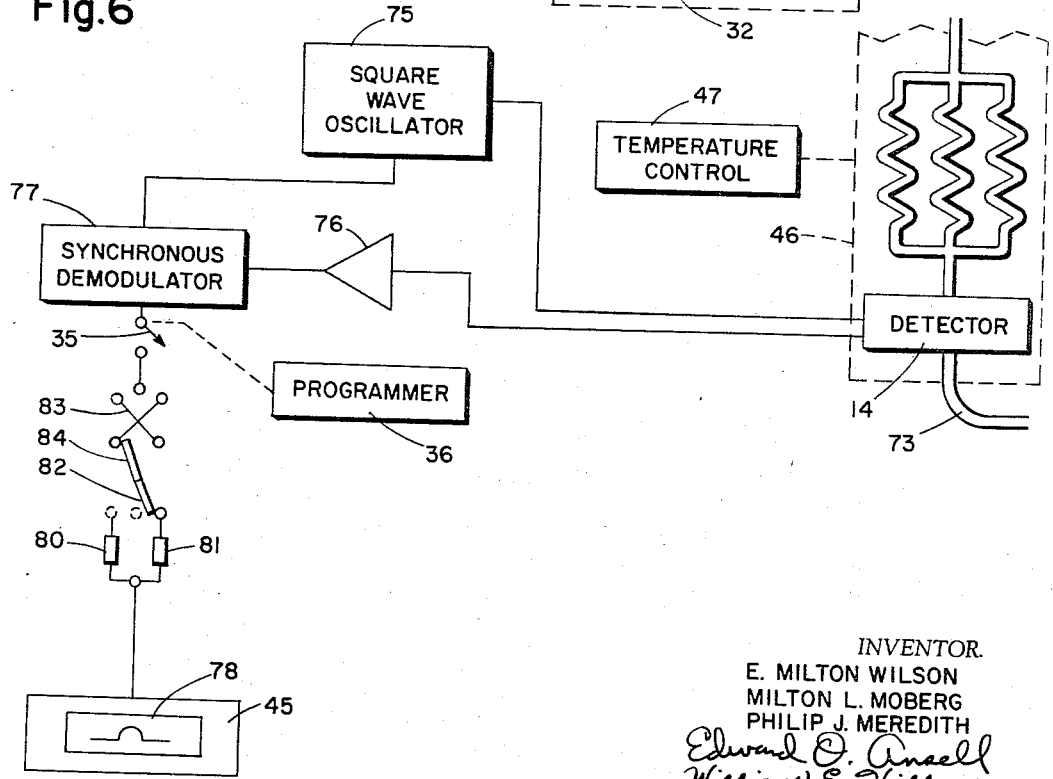

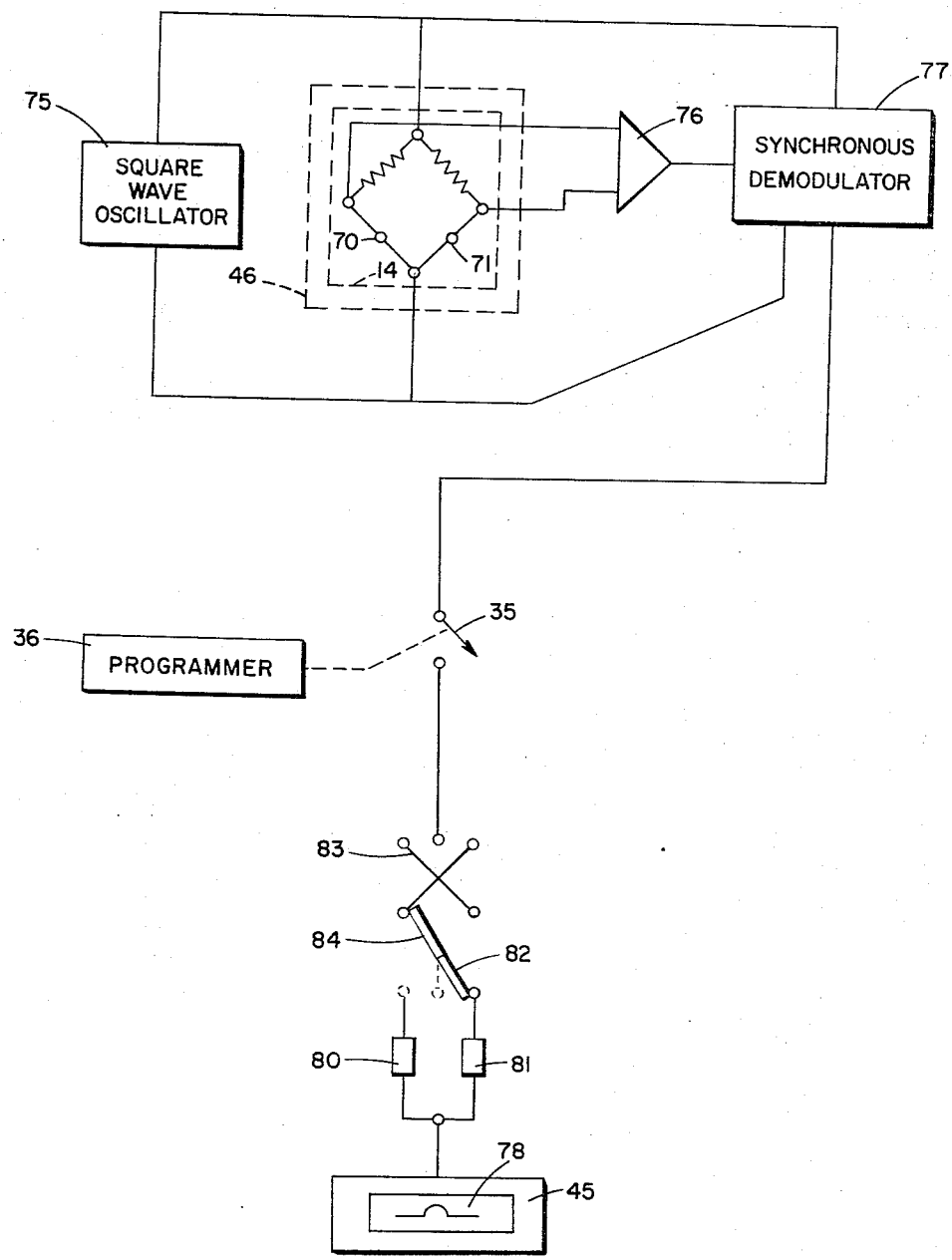

United States Patent Office 3,338,087
Patented Aug. 29, 1967

3,338,087
BREATH ANALYZING APPARATUS
Milton L. Moberg, Monrovia, Elmer Milton Wilson, Altadena, and Philip J. Meredith, West Covina, Calif., assignors to Aerojet-General Corporation, Azusa, Calif., a corporation of Ohio
Filed Mar. 4, 1964, Ser. No. 349,375
8 Claims. (Cl. 73—23)

The present invention generally relates to an apparatus for analyzing a gas stream, and more particularly to a portable apparatus and a sample-taking device forming a component thereof for analyzing the body fluid of a person to determine the existence and percentage of various substances in the body fluid, such as the presence of ethanol in the breath of a suspected drunken driver, for example.

In recent years, gas chromatography has gained acceptance as a suitable technique for analyzing a gaseous stream to determine the existence of various substances therein. Gas chromatography is a process in which physical separation between various substances in a gas stream occurs because of uniquely different affinities each substance may have for either adsorptive surfaces or liquid solutions across which a specimen to be tested is passed by an inert carrier gas.

Heretofore, apparatuses which have been developed to practice the foregoing technique of gas chromatography have been relatively complex in nature, requiring the use of skilled personnel for their operation. Such apparatuses also comprise rather cumbersome equipment of the type customarily associated with a specially-equipped laboratory and generally are substantially immobile because of their bulk and relatively high weight. Accordingly, these apparatuses utilizing the principles of gas chromatography to detect the presence and percentage of various substances in a gaseous stream have not been generally regarded as suitable for analyzing the breath of a person suspected of being intoxicated for the presence and percentage of ethanol in the breath because of their lack of portability and their high cost largely limiting them to use in specially-equipped laboratories.

Moreover, sample-taking devices heretofore known for collecting a sample of a person's breath to be subsequently analyzed as to the content of certain substances therein, such as ethanol, have not been entirely satisfactory. Such sample-taking devices are constructed so as to collect all of the breath from a person, which includes "mouth" air as well as lung air and to allow frequent condensation of the breath sample collected therein. In medical practices, it is recognized that "mouth" air does not represent a true measure of body respiratory products. Alveolar air or lung air is, however, considered to represent body equilibrium of respiratory products. If condensation occurs, a serious error factor is introduced because the condensation is responsible for reducing the amount of ethanol or other substances to be detected from the sample of breath so that a subsequent analysis of the breath sample by an apparatus utilizing the gas chromatography technique often renders a false lower reading of the percentage of the substance in the breath sample. One well-known form of sample-taking device for collecting a breath sample from a person suspected of intoxication is the so-called balloon type, in the use of which typical problems of the type described hereinabove are encountered so as to cause the breath sample collected therein to inaccurately reflect the percentage of a substance in the breath sample when it is later analyzed.

It is therefore an object of the present invention to provide a novel apparatus for analyzing the body fluid of a person to detect the presence and percentage of various substances therein, such as ethanol in the breath of a person where the person is suspected of being drunk, wherein the apparatus is highly accurate, light in weight, and relatively inexpensive as compared to gas chromatograph apparatuses of the laboratory type.

It is another object of the present invention to provide a novel apparatus utilizing the principles of gas chromatography for analyzing a gas stream and being particularly suitable for analyzing the breath of a person, wherein the apparatus is portable and can be readily operated by non-technical persons of average ability to provide accurate results in measuring and recording low concentrations of substances in a breath sample, such as ethanol in the breath of a person suspected of being intoxicated.

It is another object of this invention to provide a new and improved sample-taking device as a component of a breath analyzer utilizing the gas chromatography technique, wherein the sample-taking device is so constructed as to provide for the collection of a breath sample of alveolar air from the bottom of the lungs of a person whose breath is to be analyzed, while the so-called "mouth" air of the person is discarded in collecting the breath sample so that the breath sample more accurately reflects the respiratory products of the person at body equilibrium.

It is another object of this invention to provide a new and improved sample-taking device as a component of a breath analyzer utilizing the gas chromatography technique, wherein the sample-taking device is so constructed as to provide for substantially constant temperature of the breath sample over a significant period of time to prevent condensation of the breath sample before analysis thereof is undertaken.

Other objects and many of the attendant advantages of this invention will be readily appreciated as the same becomes better understood by reference to the following detailed description when considered in connection with the accompanying drawings wherein:

FIG. 5 is a schematic view of the components of the apparatus of FIG. 1 for performing a gas chromatography analysis of a breath sample;

Figure 1:
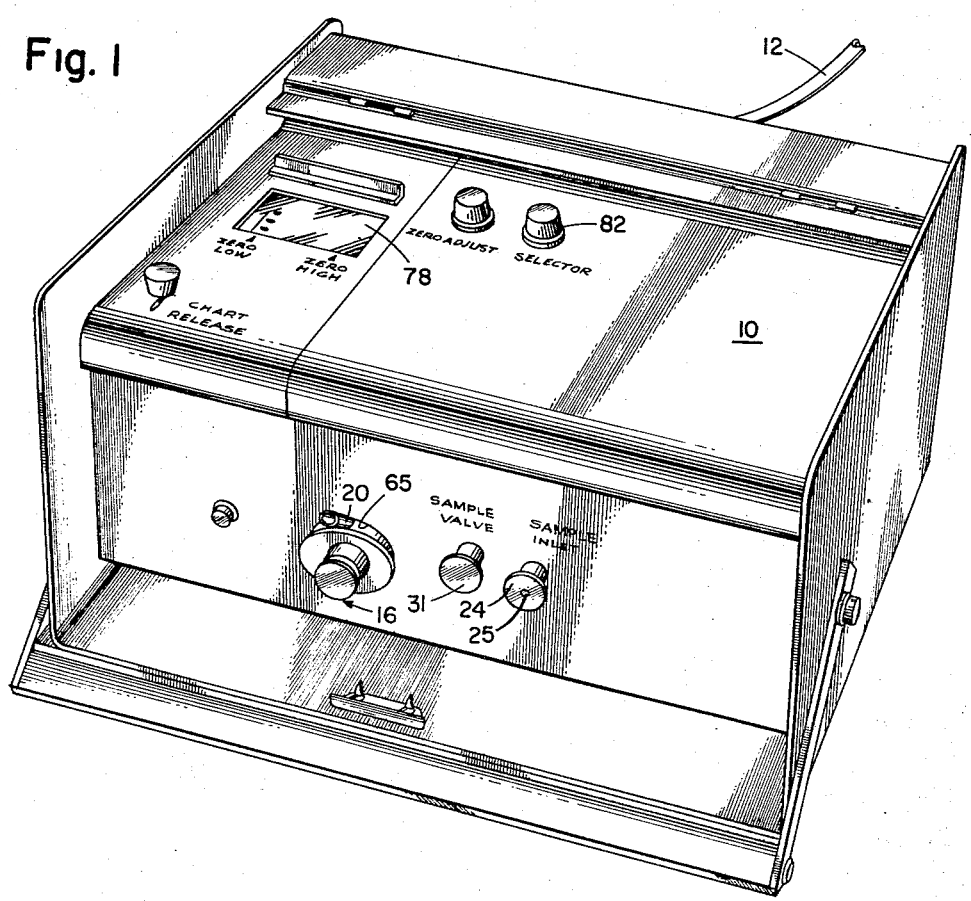
FIG. 1 is a perspective view of the improved apparatus for analyzing the breath of a person in accordance with the present invention.

FIG. 6 is a schematic electrical wiring diagram of the detecting and recording components of the apparatus of FIG. 1 for indicating the concentration of a substance in the breath sample being analyzed; and FIG. 7 is a schematic electrical wiring diagram similar to FIG. 6, but showing some details of the detector for determining the presence and concentration of a substance in the breath sample being analyzed.

Referring more specifically to the drawings, the improved apparatus for analyzing the body fluid of a person comprises a light-weight, relatively inexpensive, but highly accurate system embodying the principles of gas chromatography incased within a housing 10. While the apparatus will be herein described as being particularly adaptable to detect and determine the concentration of ethanol in the breath of a person suspected of being intoxicated, it will be understood that the apparatus is also contemplated as being suitable for analyzing the body fluid of a deceased person, for example, and for analyzing breath to determine the concentration of substances therein other than ethanol, such as oxygen, carbon dioxide, carbon monoxide, and nitrogen, as well as substances, such as marijuana and heroin, for example, and is able to differentiate each of these components without interference from each other.

In accordance with this invention, the apparatus or breath analyzer employs the technique of gas chromatography in that a source of an inert carrier gas 11 is connected to the system within the housing 10 by a conduit in the form of a flexible hose 12 for the purpose of sweeping a breath sample through a separator assembly 13 to be later described, the separator assembly 13 causing a particular substance or substances, in the breath sample to be physically separated from other constituents of the breath sample for subsequent quantitative detection by a detector 14. The flow of the inert carrier gas from the source 11 into the system through the hose 12 may be controlled by a manually operable valve 15.

The inert carrier gas may be any suitable gas having a much lower or higher thermal conductivity than air so that extremely small changes in composition may be measured. For instance, in the detection of ethanol in a breath sample taken from a person suspected of intoxication, the inert carrier gas may comprise Freon 12 which has a very low thermal conductivity, or helium or hydrogen which have a relatively high thermal conductivity, either gas having a thermal conductivity sufficiently different from the breath sample being analyzed to permit detection and analysis of minute quantities of a substance to be detected, such as ethanol. Where ethanol is the substance to be quantitatively detected, helium or hydrogen is preferred as the inert carrier gas. It will be understood, however, that use of the present apparatus for detecting substances other than ethanol may require an inert gas, other than Freon 12, helium, or hydrogen, as the carrier gas which has a thermal conductivity sufficiently different from the breath sample being analyzed.

A novel sample-taking device 16, to be hereinafter described in detail, is included as a component of the apparatus, the sample-taking device 16 being adapted to obtain a breath sample from a person which consists essentially of alveolar air or air taken from the bottom of the lungs of a person whose breath is to be tested. The sample-taking device 16 is equipped with a mouthpiece 18 which is connected to a breath inlet 20 of the sample-taking device 16 by flexible tubing 21. The mouthpiece 18 includes a plurality of baffles 22 therein which form a "spit trap" for collecting saliva in the mouthpiece 18 as a person blows thereinto, while permitting the breath of the person to pass through the mouthpiece 18 and the flexible tubing 21 into the inlet 20 of the sample-taking device 16.

When a breath sample has been collected in the sample-taking device 16, the outlet end 23 of the sample-taking device 16 which comprises a nozzle is inserted into the inlet end of the system. In the latter respect, it will be observed that the front wall of the housing 10 is provided with a resilient member of suitable plastic or rubber material in the form of a plug 24 having a disc-like head provided with a central opening 25 which forms the inlet end of the system. Referring to FIGURE 5, it will be seen that the disc-like head of the plug 24 includes a tapered mouth portion leading to the centrally-located inlet opening 25 to facilitate introduction of the outlet nozzle 23 on the sample-taking device 16 thereinto, while providing a fluid-tight seal with the outlet nozzle 23 upon proper introduction of the nozzle 23 into the inlet opening 25.

The breath sample from the sample-taking device 16 is injected through the outlet nozzle 23 and is directed to an injector valve assembly 26 through an inlet tube 27 extending between the inlet opening 25 and the injector valve assembly 26. The injector valve assembly 26 comprises a ported valve housing 30 having a valve member 31 mounted for movement therein. As shown in FIGURE 5, the valve member 31 may comprise a reciprocable valve plunger movable between extended and depressed positions for entraining the breath sample to be analyzed into a stream of carrier gas and introducing the stream of carrier gas with the breath sample entrained therein into the separator assembly 13. In this respect, a sample specimen trapping member is operably associated with the injector valve 26, the sample specimen trapping member comprising a tubular loop 32 having its opposite ends 32a, 32b respectively connected to ports in the valve housing 30.

A tube 33 extends between the separator assembly 13 and the valve housing 30 to connect the separator assembly 13 with the interior of the valve housing 30. The hose 12 through which the carrier gas from the source 11 is supplied and the inlet tube 27 through which the breath sample from the sample-taking device 16 is supplied communicate with the interior of the valve housing 30 on opposite sides of the connection of the tube 33 with the valve housing 30. The valve plunger 31 is provided with a plurality of axially spaced sealing means in the form of resilient O-rings 34 engaging the valve housing 30 in sealing relationship. The O-rings 34 are respectively positioned such that the inlet tube 27 is communicatively connected to the end 32a of tubular loop 32 and the tubular loop 32 is vented to atmosphere through its other end 32b, while the hose 12 from the source 11 of inert carrier gas is connected to the separator assembly 13 through the tube 33 in the extended position of the valve plunger 31, which is illustrated in FIGURE 5. Upon depressing the valve plunger 31, the O-ring seals 34 are so disposed that the hose 12 is communicatively connected to the end 32b of the tubular loop 32 whose other end 32a is brought into communication with the tube 33 so as to connect the tubular loop 32 to the separator assembly 13 to provide for the carrier gas to sweep through the tubular loop 32, entraining the specimen of the breath sample located therein, and passing through the tube 33 into the separator assembly 13. It will be observed that depression of the valve plunger 31 also actuates a timer switch 35 to set a programmer 36 (FIGURES 6 and 7) into operation as will be subsequently described.

As illustrated in FIGURES 5 and 6, the separator assembly 13 comprises a plurality of tubular columns, there being three columns 40, 41, and 42 shown into which the gaseous stream comprising the carrier gas and the specimen of the breath sample entrained therein is directed. The three columns, 40, 41, and 42 contain various materials as hereinafter described for selectively removing and physically separating components of the breath sample being introduced into the separator assembly 13. While three columns 40, 41, and 42 are shown as comprising the separator assembly 13, it will be understood that a single column may comprise the separator assembly 13 within the spirit of this invention, wherein the single column includes materials therein suitable for separating a particular substance to be detected from any interferring components in the breath sample. The three columns 40, 41, and 42, as shown, permit the detection and indication of the concentration of separate substances in the breath sample being analyzed. In the system as illustrated in FIGURES 5 and 6, column 40, for example, may contain therewithin a material for resolving oxygen from nitrogen, such as a synthetic sodium-calcium zeolite known under the name "Linde 5A Molecular Sieve" available from the Linde Company, a division of Union Carbide Corporation. Column 41 may contain silica gel for resolving carbon dioxide from air, while column 42 may provide for full flow of the breath sample therethrough and may contain polyethylene glycol in an inert substrate, such as calcined diatomaceous earth which separates ethanol from any interferring constituents of the breath sample. The physical lengths of columns 40, 41, and 42 comprising the separator assembly 13 may be varied as required to provide for a selected adjustment of the length of the passage to be traversed for a particular gaseous stream being analyzed. The constituents of the breath sample entrained in the carrier gas are thereby physically separated upon passing through the separator assembly 13 and emerge therefrom to be passed through a detector 14 in a predetermined time sequence so that indications of the constituents which pass through each of the columns 40, 41, and 42 are sequentially recorded on a recorder 45.

The separator assembly 13, the detector 14, the injector valve assembly 26, and the various tubes contained within the housing 10 of the apparatus and connecting the inlet opening 25 of the system and the source 11 of the inert carrier gas into the injector valve assembly 26 are enclosed within a heated chamber or oven 46 which is equipped with a highly sensitive temperature control assembly 47 for insuring that the components of the system within the oven 46 are maintained at a constant predetermined temperature.

Figure 3:
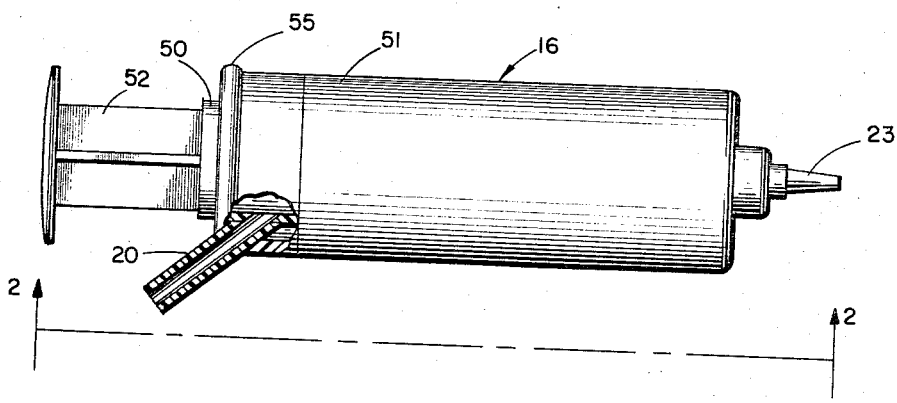
FIG. 3 is a side elevational view, partially in longitudinal section, of the novel sample-taking device forming a component of the apparatus.
Figure 4:
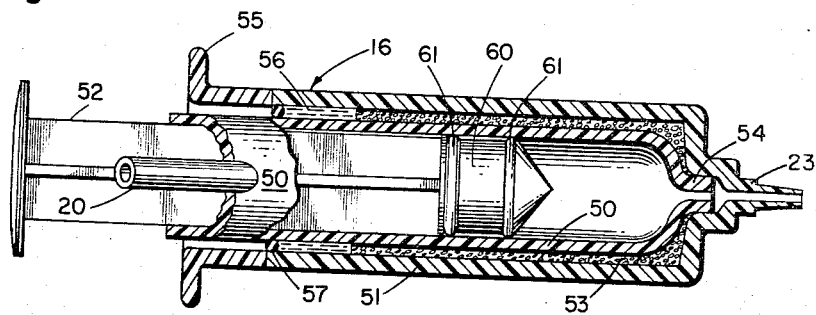
FIG. 4 is a longitudinal sectional view, partially in elevation, of the sample-taking device.

Referring now to the novel sample-taking device 16, as illustrated more particularly in FIGURES 3 and 4, the sample-taking device 16 comprises an inner receptacle 50, an outer receptacle 51 generally space radially outwardly from the inner receptacle 50, an ejection member 52 slidably received within the inner receptacle 50, and a temperature-maintaining material in the form of a eutectic salt 53 in the space between the inner and outer receptacles 50 and 51. The tubular breath inlet 20 is disposed at one end of the sample-taking device 16 and communicates with the interior of the inner receptacle 50. The outlet nozzle 23 is disposed at the opposite end of the sample-taking device 16 and communicates with the interior of the inner receptacle 50. The inner receptacle 50 comprises a cylinder, one end of which is flared radially inwardly to terminate in an axially extending tubular tip 54, the tubular tip 54 of the inner cylinder 50 being snugly received within a throat portion at the corresponding end of the outer receptacle or cylindrical jacket 51 to communicate with the outlet nozzle 23 of the sample-taking device 16 which is formed integral with the outer cylindrical jacket 51. The outlet nozzle 23 is provided with an axially extending opening therethrough in registration with the opening through the tubular tip 54 of the inner cylinder 50 so as to provide an opening leading from the interior of the cylinder 50 through the nozzle 23. At its opposite end, the outer cylindrical jacket 51 is provided with an annular radially extending external flange 55 acting as a support against which the fingers of an operator may be placed to facilitate movement of the ejection member 52 into and out of the inner cylinder 50 in operating the sample-taking device 16 by forcing a sample of breath from the inner cylinder 50 through the outlet nozzle 23.

The temperature-maintaining material 53 disposed in the space between the inner cylinder 50 and the outer cylindrical jacket 51 preferably comprises a eutectic salt having a melting point approximating the normal body temperature of a person so that the temperature-maintaining material 53 may be heated, as hereinafter described, sufficiently to become liquefied (as partially illustrated at 56). Upon being liquefied, the temperature-maintaining material 53 serves to maintain a sample of breath contained within the inner cylinder 50 of the sample-taking device 16 at a substantially constant temperature over a significant period of time by releasing heat as the temperature-maintaining material 53 gradually solidifies, the heat released by the temperature-maintaining material 53 being its "heat of fusion." Any eutectic material having a melting point approximating the body temperature for a person may be suitably employed in the sample-taking device 16, one such material being calcium nitrate tetra-hydrate. The eutectic salt is retained in the space between the inner cylinder 50 and the outer cylindrical jacket 51 by a resilient sealing ring 57 which is inserted in the space between the inner cylinder 50 and the outer cylindrical jacket 51 at the end of the sample-taking device 16 remote from the nozzle 23 after the space has been filled by the eutectic salt 53 and sealingly engages the cylinder 50 and the jacket 51.

The ejection member 52 comprises a piston having a piston head 60 adapted to be slidably received within the inner cylinder 50 and carrying resilient O-ring seals 61 thereon for providing a fluid-tight seal between the piston head 60 and the inner cylinder 50 as the piston head 60 is slidably moved within the inner cylinder 50. In taking a sample of breath from a person, the operator first positions the piston 52 so that the piston head 60 is disposed at the open end or mouth of the inner cylinder 50 axially rearwardly of the tubular breath inlet 20. The person whose breath is to be analyzed then blows through the mouthpiece 18, and his breath is admitted into the inner cylinder 50 of the sample-taking device 16 by the tubular inlet 20 communicating therewith. The operator then pushes the piston 52 forwardly into the inner cylinder 50 so that the piston head 60 is disposed axially inwardly of the connection between the tubular inlet 20 and the cylinder 50 which traps a samply of breath within the inner cylinder 50. The relatively small-bore or restricted openings through the tubular tip 54 and the nozzle 23 of the sample-taking device 16 do not permit any significant diffusion between the trapped breath sample within the inner cylinder 50 and the atmosphere outwardly of the sample-taking device 16, nor is there any appreciable loss of the breath sample through the outlet nozzle 23. Moreover, so-called "mouth air" of the person whose breath is being analyzed is initially permitted to be discarded through the nozzle 23 of the sample-taking device 16, first, by virtue of the restricted opening through the nozzle 23 communicating with the interior of the inner cylinder 50 and the pressure sustained by the blowing of the person in collecting the breath sample, and secondly, by the action of the operator in partially pushing the piston 52 within the inner cylinder 50. Thus, the breath sample specimen is substantially alveolar air or lung air. The tubular loop 32 comprising the sample specimen trapping member is vented through its end 32b to atmosphere when the valve plunger 31 of the injector valve assembly 26 is disposed in its extended position. Accordingly, the breath sample to be analyzed by the system according to this invention comprises essentially alveolar air from the bottom of the lungs of a person whose breath is to be analyzed, the so-called "mouth" air being substantially discarded in the collection of the breath sample by the sample-taking device 16 and the subsequent ejection of the breath sample from the sample-taking device 16 into the system for analysis by pushing the piston 52 fully forward in the inner cylinder 50.

Figure 2:
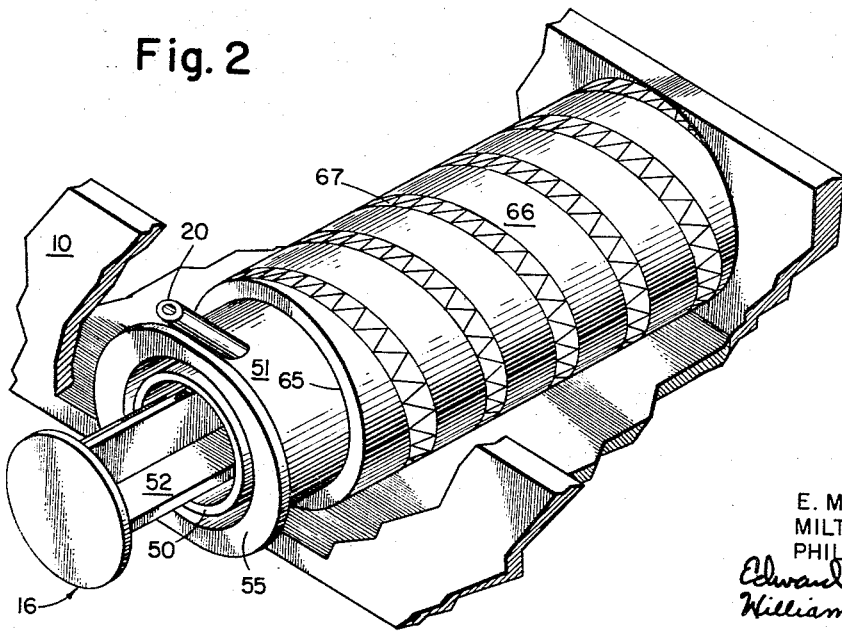
FIG. 2 is a fragmentary enlarged isometric view of a portion of the apparatus shown in FIG. 1, illustrating the details of a chamber in the housing of the apparatus and a novel sample-taking device removably received therein.

Referring to FIGURES 1 and 2, the sample-taking device 16 is normally removably received within a chamber 65 formed in the housing 10 and opening onto the front wall thereof. The chamber 65 is defined by a substantially cylindrical chamber wall 66 having suitable heating means associated therewith for heating the interior of the chamber so that the eutectic salt 53 of the sample-taking device 16 will melt and assume a liquid state when the sample-taking device 16 is received in the chamber 65. As shown in FIGURE 2, the means for heating the chamber 65 may comprise electrical resistance wiring 67 coiled about the outer cylindrical surface of the chamber wall 66 and connected to a suitable source of electrical energy so as to become heated when energized.

The sample-taking device 16 is normally stored in the chamber 65 when not in use so that the eutectic material 53 will assume a liquid state when the electrical resistance wiring 67 is energized. When the sample-taking device 16 is subsequently used to collect a breath sample to be analyzed, the eutectic material 53 by releasing heat as it gradually solidifies maintains the breath sample at a substantially constant temperature approximating body temperature over a significant period of time should there be any delay in injecting the breath sample into the analyzing system to reduce any tendency of the breath sample toward condensation of the moisture therein which would introduce an error factor into the subsequent analysis of the breath sample by removing some of the ethanol therefrom.

Referring now to the detecting and indicating assembly, in the particular illustrated embodiment, the detector 14 determines the percentage of ethanol in the breath sample being analyzed by virtue of differences in the thermal conductivity of the constituents comprising the breath sample. It will be understood, however, that other suitable types of detectors may be employed within the spirit of the invention, such as detectors utilizing differences in ionization, sonic, radiation attenuation, or chemical relationships as a basis for quantitative analysis of a substance in a breath sample. As shown in FIG. 7, the detector 14 comprises a Wheatstone bridge having thermistor beads 70 and 71 in adjacent branches thereof. The Wheatstone bridge is first balanced by using the thermistor bead 70 as a reference point and subjecting the reference thermistor bead 70 to a stream of the carrier gas taken from the system at a point upstream of the inlet opening 25 for the sample-taking device 16, while at the same time the thermistor bead 71 is positioned in the stream of the carrier gas emerging from the separator assembly 13. In analyzing the constituents of a breath sample, the breath sample is injected into the system in the manner described and the thermistor bead 71 is subjected to the gas stream including the breath sample entrained in the carrier gas after emergence from the separator assembly 13. Thus, assuming that the carrier gas is helium, which has a relatively high thermal conductivity, the gas stream emerging from the separator assembly 13 will have a lower thermal conductivity because of the breath sample entrained therein. Accordingly, the thermistor bead 71 is subjected to a gas stream of lower thermal conductivity than the reference thermistor bead 70, and the Wheatstone bridge is unbalanced so that an electrical output signal indicative of the separated constituents of the breath sample is emitted from the detector 14. After passing through the detector 14, the gas stream is exhausted therefrom through a vent tube 73.

Power is provided to the detector 14 from a square wave oscillator 75 which provides a desired square wave pulse train of energy thereto. The square wave oscillator 75 may be powered by a suitable source of electrical energy, it being contemplated that the electrical energy may be derived from the battery of a vehicle with appropriate conversion to alternaaing current before being fed into the square wave oscillator 75, as well as by alternating current from an electrical outlet.

The electrical signal emitted from the detector 14 in the illustrated embodiment of the invention will be in the form of distinct groups of individual pulses, wherein one group of pulses will correspond to the physical separation of constituents of the breath sample occurring in column 40, another group of pulses will correspond to the separation occurring in column 41, and another group of pulses will correspond to the separation occurring in column 42. Column 40 containing a synthetic sodium-calcium zeolite will resolve oxygen from the breath sample; column 41 containing silica gel will resolve carbon dioxide; and column 42 containing polyethylene glycol in an inert substrate such as calcined diatomaceous earth will separate ethanol from any interferring substances in the breath sample, such as water. An amplifier 76 is connected to the detector 14 for amplifying the electrical signal emitted therefrom. The length of time required for the gas stream including the breath sample to emerge from the separator assembly 13 is constant under the same operating conditions and therefore provides a time basis by which the electrical signal emitted from the detector 14 can be isolated into the various distinct groups of pulses as will be later described.

After the electrical signal emitted from the detector 14 has been amplified by the amplifier 76, the amplified electrical signal is passed to a demodulator or rectifier 77. The demodulator 77 converts the pulse information received from the amplifier 76 to D-C signal information which is fed to the recorder 45 through the programmer 36. The programmer 36 is automatically connected between the demodulator 77 and the recorder 45 by the closing of the time switch 35 which is effected by the valve plunger 31 when the valve plunger 31 is moved to its depressed position for injecting a breath sample into the separator assembly 13.

The programmer 36 is set to provide a predetermined time cycle during which the recorder 45 will be operable so that only the signal information which is desired may be visually indicated by the recorder 45. Thus, the programmer 36 may be set, for example, so as to eliminate the signal information pertaining to the air and water contained in the breath sample from being indicated by the recorder 45. In the latter example, the programmer 36 will pass only the signal information pertaining to the ethanol present in the breath sample to the recorder 45 where it will be visually indicated as an ethanol peak on a sensitized paper strip 78 of the recorder 45. Any of several commercially available recorders may be used as the recorder 45, one such recorder being the Rustrak Model 88 Recorder, 1 milliamp, manufactured by the Rustrak Industrial Company, Inc., of Manchester, N.H.

Preferably, the apparatus is equipped with a high and a low sensitivity range in order to properly indicate excessively high and low concentrations of ethanol or other substances for which the breath sample is being tested on the sensitized paper strip 78 of the recorder 45. Thus, where a low concentration of ethanol is present in the breath sample, the "low" sensitivity range of the apparatus would be used and a peak of sufficient size to be readily measured would be indicated on the paper strip 78 of the recorder 45. Where a high concentration of ethanol is present in the breath sample, the "high" sensitivity range of the apparatus would be used rather than the "low" sensitivity range in order to prevent the peak from running off the scale of the sensitized paper strip 78 of the recorder 45. This is accomplished by interposing relatively high and low resistors 80, 81 in the circuitry wiring connecting the demodulator 77 and the recorder 45, the resistors 80, 81 being arranged in parallel and being alternately connected into the circuit including the recorder 45 by a manually operable control switch 82. The high resistor 80 and the low resistor 81 thereby comprise alternate sensitivity range means, wherein for example, the high range may be 0–0.40% of blood equivalent alcohol while the low range may be 0–0.20% of blood equivalent alcohol.

To provide for positive identification of which sensitivity range was in use during an analysis of a breath sample, polarity reversal of the electrical terminals of the recorder 45 occurs when the control switch 82 is moved so as to be disconnected from one resistor and connected to the other resistor. This causes the base of the ethanol peak indicated on the sensitized paper strip 78 of the recorder 45 to change sides so that the base of the ethanol peak as indicated on the sensitized paper strip 78 will always be on the same side of the paper strip 78 for the low sensitivity range of the apparatus and will always be on the opposite side of the paper strip 78 for the high sensitivity range. To this end, the control switch 82 may be a suitable type of reversible switch. However, as shown, it is preferred to include a separate reversible switch 83 in the circuitry between the demodulator 77 and the recorder 45. The reversible switch 83 is operably connected to the manually operable control switch 82 by a suitable mechanical linkage 84 such that movement of the control switch 82 between the two resistors 80, 81 to change the sensitivity range of the apparatus simultaneously actuates the reversible switch 83 to reverse the form of signal information received by the recorder 45. Thus, the location of the base of the ethanol peak indicated on the sensitized paper strip 78 of the recorder 45 with respect to the sides of the strip 78 automatically signifies which of the high and low sensitivity ranges was in effect during the analysis.

It will be seen therefore that we have disclosed an improved apparatus for analyzing the breath of a person to determine the concentration of a substance such as ethanol therein. The apparatus while being highly accurate is portable because of its light weight and can be operated by non-technical personnel. The novel sample-taking device forming a component of the apparatus substantially eliminates any tendency of the breath sample collected therein toward condensation and thereby enhances the reliability of the results obtained from the analysis of the breath sample.

It will be understood that various modifications may be made in the specific embodiment herein disclosed without departing from the spirit of the present invention, and that the foregoing description and the accompanying drawings are not to be construed in a limiting sense.

We claim:
1. A portable breath analyzing apparatus for determining the presence and concentration of a substance in a breath sample, said apparatus comprising:
   (a) a housing provided with a sample-taking inlet for introducing a sample of breath from a person into said housing and temporarily retaining the sample of breath,
   (b) separator means within said housing for physically separating the substance from other constituents of the breath sample,
   (c) injector valve means in said housing interposed between said sample-taking inlet and said separator means and including a manually operable valve plunger projecting outwardly from said housing for introducing the breath sample into said separator means,
   (d) said valve plunger being normally disposed in a position disconnecting the sample-taking inlet from said separator means but being manually movable with respect to said housing to a second position in which the sample-taking inlet is connected to said separator means,
   (e) means within said housing operably connected to said separator means for detecting the presence of the substance in the breath sample and indicating the concentration of the substance,
   (f) said housing being provided with a chamber in which said detector means and said separator means are enclosed, and
   (g) means controlling the temperature of the chamber in which said detector means and said separator means are enclosed for maintaining said detector means and said separator means at a selected temperature.

2. A portable breath analyzing apparatus for determining the presence and concentration of a substance in a breath sample, said apparatus comprising:
   (a) a housing provided with a sample-taking inlet for introducing a sample of breath from a person into said housing,
   (b) separator means within said housing for physically separating the substance from other constituents of the breath sample,
   (c) a source of an inert gas for providing a carrier gas in which the breath sample is to be entrained,
   (d) tubular trapping means within said housing and having a pair of openings for retaining alveolar air of the breath sample therein,
   (e) injector valve means in said housing interposed between said sample-taking inlet and said separator means and including a manually operable valve plunger projecting outwardly from said housing for introducing the breath sample into said separator means,
   (f) said valve plunger being normally disposed in a first position connecting the sample-taking inlet to one opening of said tubular trapping means for disposing the alveolar air of the breath sample within said tubular trapping means, the sample-taking inlet and said tubular trapping means being disconnected from said separator means when said valve plunger is disposed in its first position,
   (g) said valve plunger being manually movable with respect to said housing to a second position connecting said source of inert gas to the other opening of said tubular trapping means and connecting said one opening of said tubular trapping means to said separator means so that the alveolar air of the breath sample is entrained in the carrier gas and is introduced therewith into said separator means,
   (h) means within said housing operably connected to said separator means for detecting the presence of the substance in the breath sample and indicating the concentration of the substance,
   (i) said housing being provided with a chamber in which said detector means and said separator means are enclosed, and
   (j) means controlling the temperature of the chamber in which said detector means and said separator means are enclosed for maintaining said detector means and said separator means at a selected temperature.

3. A portable breath analyzing apparatus for determining the presence and concentration of a substance in a breath sample, said apparatus comprising:
   (a) a housing provided with a sample-taking inlet for introducing a sample of breath from a person into said housing,
   (b) separator means within said housing for physically separating the substance from other constituents of the breath sample,
   (c) a source of an inert gas for providing a carrier gas in which the breath sample is to be entrained,
   (d) a tubular loop within said housing and having open opposite ends for retaining alveolar air of the breath sample therein,
   (e) injector valve means in said housing interposed between said sample-taking inlet and said separator means and including a manually operable valve plunger projecting outwardly from said housing for introducing the breath sample into said separator means, said valve plunger being manually movable between extended and depressed positions with respect to said housing,
   (f) said valve plunger being normally disposed in its extended position connecting the sample-taking inlet to one open end of said tubular loop for disposing the alveolar air of the breath sample within said tubular loop, the sample-taking inlet and said tubular loop being disconnected from said separator means when said valve plunger is disposed in its extended position,
   (g) said valve plunger being manually movable inwardly with respect to said housing to its depressed position connecting said source of inert gas to the other open end of said tubular loop and connecting said one open end of said tubular loop to said separator means so that the alveolar air of the breath sample is entrained in the carrier gas and is introduced therewith into said separator means,
   (h) means within said housing operably connected to said separator means for detecting the presence of the substance in the breath sample and indicating the concentration of the substance,
   (i) said housing being provided with a chamber in which said detector means and said separator means are enclosed, and (j) means controlling the temperature of the chamber in which said detector means and said separator means are enclosed for maintaining said detector means and said separator means at a selected temperature.

4. An apparatus for analyzing a breath sample to determine the presence and concentration of a substance therein comprising:
(a) sample-taking means for collecting and temporarily retaining a sample of breath from a person,
(b) a source of an inert gas for providing a carrier gas in which the breath sample is to be entrained,
(c) separator means for physically separating the substance from other constituents of the breath sample,
(d) means for introducing the carrier gas and the breath sample entrained therein into said separator means,
(e) detector means connected to said separator means for detecting the concentration of the substance in the breath sample and emitting an electrical signal having an intensity proportional to the concentration of the substance in the breath sample,
(f) an amplifier connected to said detector means for amplifying the electrical signal emitted from said detector means,
(g) square wave oscillator means connected to said detector means for providing a selected square wave pulse train of energy to said detector means,
(h) demodulating means connected to said amplifier for converting the amplified electrical signal received from said amplifier into D-C signal information,
(i) recorder means connected to said demodulating means for providing an indication of the signal information received from said demodulating means,
(j) alternate first and second sensitivity range means connected between said demodulating means and said recorder means,
(k) a manually operable control switch movable to selectively connect one of said first and second sensitivity range means between said demodulating means and said recorder means to determine which of said first and second sensitivity range means is operable,
(l) a reversible switch operably connected to said control switch and connected between said demodulating means and said recorder means, and
(m) said reversible switch being actuated in response to the actuation of said control switch changing the sensitivity range means to reverse the form of signal information received by said recorder means from said demodulating means so that the indication of the presence and concentration of the substance in the breath sample provided by said recording means automatically signifies which of the first and second sensitivity range means is in effect.

5. An apparatus for analyzing a breath sample to determine the presence and concentration of a substance therein comprising:
(a) sample-taking means for collecting and temporarily retaining a sample of breath from a person,
(b) a source of an inert gas for providing a carrier gas in which the breath sample is to be entrained,
(c) separator means for physically separating the substance from other constituents of the breath sample,
(d) means for introducing the carrier gas and the breath sample entrained therein into said separator means,
(e) detector means connected to said separator means for detecting the concentration of the substance in the breath sample and emitting an electrical signal having an intensity proportional to the concentration of the substance in the breath sample,
(f) means having a controlled temperature enclosing said detector means and said separator means for maintaining said detector means and said separator means at a selected temperature,
(g) an amplifier connected to said detector means for amplifying the electrical signal emitted from said detector means,
(h) square wave oscillator means connected to said detector means for providing a selected square wave pulse train of energy to said detector means,
(i) demodulating means connected to said amplifier for converting the amplified electrical signal received from said amplifier into D-C signal information,
(j) recorder means connected to said demodulating means for providing an indication of the signal information received from said demodulating means, and
(k) programming means connected intermediate said demodulating means and said recorder means for selecting which signal information from said demodulating means is to be indicated by said recorder means so that an indication of the presence and concentration of the substance in a breath sample is obtained.

6. An apparatus for analyzing a breath sample to determine the presence and concentration of a substance therein comprising:
(a) a housing having an outwardly opening chamber provided therein,
(b) sample-taking means for collecting and temporarily retaining a sample of breath from a person, said sample-taking means being removably receivable within the chamber in said housing,
(c) a source of an inert gas externally of said housing for providing a carrier gas in which the breath sample is to be entrained,
(d) separator means within said housing for physically separating the substance from other constituents of the breath sample,
(e) means for introducing the carrier gas and the breath sample entrained therein into said separator means,
(f) detector means within said housing connected to said separator means for detecting the concentration of the substance in the breath sample and emitting an electrical signal having an intensity proportional to the concentration of the substance in the breath sample,
(g) means within said housing having a controlled temperature enclosing said detector means and said separator means for maintaining said detector means and said separator means at a selected temperature,
(h) an amplifier within said housing and connected to said detector means for amplifying the electrical signal emitted from said detector means,
(i) square wave oscillator means within said housing and connected to said detector means for providing a selected square wave pulse train of energy to said detector means,
(j) demodulating means within said housing connected to said amplifier for converting the amplified signal received from said amplifier into D-C signal information,
(k) recorder means within said housing connected to said demodulating means for providing an indication of the signal information received from said demodulating means, and
(l) programming means within said housing connected intermediate said demodulating means and said recorder means for selecting which signal information from said demodulating means is to be indicated by said recorder means so that an indication of the presence and concentration of the substance in a breath sample is obtained.

7. An apparatus for analyzing a breath sample to determine the presence and concentration of a substance therein comprising:
(a) separator means for physically separating the substance from other constituents of the breath sample,
(b) a source of an inert gas for providing a carrier gas in which the breath sample is to be entrained,
(c) an injector valve for introducing the breath sample into the carrier gas and the subsequent mixture into said separator means, said injector valve including
(1) a housing,
(2) a valve member disposed within said housing in radially inwardly spaced relation thereto for defining an annular axially elongated space therebetween,
(3) plural axially spaced annular sealing means on said valve member and in sealing engagement with said housing so as to divide said annular axially elongated space into a plurality of annular chambers, and
(4) a tubular loop having its opposite ends connected to said housing at axially spaced positions thereon and respectively communicating with said annular axially elongated space;
(d) said valve member being manually movable with respect to said housing between first and second positions shifting the location of said plurality of annular chambers along the length of said housing,
(e) said injector valve being adapted to receive the breath sample in a first annular chamber which is connected to one end of said tubular loop when said valve member is disposed in a first position for admitting the alveolar air of the breath sample within said tubular loop, said injector valve connecting said source of inert gas to a second annular chamber directly connected to said separator means when said valve member is disposed in the first position,
(f) said injector valve connecting said source of inert gas to the other end of said tubular loop through said second annular chamber and connecting said one end of said tubular loop to said separator means through said first annular chamber when said valve member is manually moved to its second position so that the alveolar air of the breath sample is entrained in the carrier gas sweeping through said tubular loop to be introduced therewith into said separator means, and
(g) means operatively connected to said separator means for detecting the presence of the substance in the breath sample and indicating the concentration of the substance.

8. A portable breath analyzing apparatus for determining the presence and concentration of a substance in a breath sample, said apparatus comprising:
(a) a housing provided with a sample-taking inlet for introducing a sample of breath from a person into said housing,
(b) separator means within said housing for physically separating the substance from other constituents of the breath sample,
(c) a source of an inert gas for providing a carrier gas in which the breath sample is to be entrained,
(d) an injector valve in said housing interposed between said sample-taking inlet and said separator means for introducing the breath sample into the carrier gas and the subsequent mixture into said separator means, said injector valve including
(1) an elongated valve housing wholly disposed within said housing,
(2) a manually operable elongated valve plunger disposed within said valve housing in radially inwardly spaced relation thereto for defining an annular axially elongated space therebetween, said valve plunger projecting outwardly from said valve housing and having an enlarged head disposed outwardly of said housing,
(3) plural axially spaced annular sealing means on said valve plunger and in sealing engagement with said valve housing so as to divide said annular axially elongated space into a plurality of annular chambers, and
(4) a tubular loop having its opposite ends connected to said valve housing at axially spaced positions thereon and respectively communicating with said annular axially elongated space;
(e) said valve plunger being manually movable between extended and depressed positions with respect to said valve housing and said housing upon manipulating the enlarged head thereof for shifting the location of said plurality of annular chambers along the length of said valve housing,
(f) said valve plunger being normally disposed in its extended position in which the sample-taking inlet is connected to one end of said tubular loop through a first annular chamber for admitting the alveolar air of the breath sample within said tubular loop, the source of inert gas is connected to said separator means through a second annular chamber, and the sample-taking inlet and said tubular loop are sealed off from said separator means by said plural annular sealing means,
(g) said valve plunger being manually movable inwardly with respect to said valve housing and said housing by pressing its enlarged head to dispose said valve plunger in its depressed position in which said source of inert gas is connected to the other end of said tubular loop through the second annular chamber, and said one end of said tubular loop is connected to said separator means through the first annular chamber so that the alveolar air of the breath sample is entrained in the carrier gas sweeping through said tubular loop to be introduced therewith into said separator means,
(h) means within said housing operably connected to said separator means for detecting the presence of the substance in the breath sample and indicating the concentration of the substance,
(i) said housing being provided with a chamber in which said detector means and said separator means are enclosed, and
(j) means controlling the temperature of the chamber in which said detector means and said separator means are enclosed for maintaining said detector means and said separator means at a selector temperature.

References Cited

UNITED STATES PATENTS

| | | | |
|---|---|---|---|
| 3,062,507 | 11/1962 | Andrus | 165—104 |
| 3,084,536 | 4/1963 | McNabb | 73—27 |
| 3,085,440 | 4/1963 | Guenther | 73—421.5 |
| 3,134,257 | 5/1964 | Reinecke | 73—27 |
| 3,187,558 | 6/1965 | Koncen et al. | 73—27 |
| 3,196,689 | 7/1965 | Forrester et al. | 73—421.5 |
| 3,213,933 | 10/1965 | Kasparian | 165—104 |

OTHER REFERENCES

Mackay et al.: Drug and Cosmetic Industry, 86, January–February 1960.

JAMES J. GILL, *Acting Primary Examiner.*

RICHARD C. QUEISSER, *Examiner.*

L. R. FRANKLIN, C. I. McCLELLAND,
*Assistant Examiners.*